(12) United States Patent
Chasko et al.

(10) Patent No.: US 6,715,078 B1
(45) Date of Patent: Mar. 30, 2004

(54) METHODS AND APPARATUS FOR SECURE PERSONAL IDENTIFICATION NUMBER AND DATA ENCRYPTION

(75) Inventors: Stephen John Chasko, Flowery Branch, GA (US); David Junghans, Suwanee, GA (US); Adrian Shields, Glenrothes Fife (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/537,851

(22) Filed: Mar. 28, 2000

(51) Int. Cl.[7] .................................................. G06F 1/24
(52) U.S. Cl. ....................... 713/193; 713/182; 713/200; 713/201
(58) Field of Search ................................. 713/193, 182, 713/200, 201

(56) References Cited

U.S. PATENT DOCUMENTS

| | | | |
|---|---|---|---|
| 4,968,873 A | 11/1990 | Dethloff et al. | 235/380 |
| 5,534,857 A | 7/1996 | Laing et al. | 340/825.34 |
| 5,584,043 A | 12/1996 | Burkart | 395/882 |
| 5,663,553 A | 9/1997 | Aucsmith | 235/492 |
| 5,694,471 A | 12/1997 | Chen et al. | 380/25 |
| 5,768,386 A | 6/1998 | Yokomoto et al. | 380/24 |
| 5,825,871 A | 10/1998 | Mark | 379/355 |
| 5,844,218 A | 12/1998 | Kawan et al. | 235/380 |
| 5,844,497 A | 12/1998 | Gray | 34/825.34 |
| 5,889,941 A | 3/1999 | Tushie et al. | 395/186 |

*Primary Examiner*—Thomas R. Peeso
(74) *Attorney, Agent, or Firm*—Priest & Goldstein, PLLC

(57) ABSTRACT

A system and methods for implementing a low cost and simple PIN encryption device is disclosed. The PIN encryption device may be incorporated into customer transaction terminals, ATMs and PIN pads for use with POS terminals or other transaction devices. The PIN encryption device securely stores PIN encryption keys and PIN encryption algorithms that are used to encrypt user entered PINs on a cryptographic smart card. The system disclosed is a physically secure device that protects the integrity of the encryption keys and algorithms. The system also protects the cryptographic smart card from tampering, and prevents the discovery of PIN data by tapping the external interfaces of the customer transaction terminal.

25 Claims, 7 Drawing Sheets

METHODS AND APPARATUS FOR SECURE PERSONAL IDENTIFICATION NUMBER AND DATA ENCRYPTION

FIELD OF THE INVENTION

The present invention relates generally to improvements in the methods and apparatus used to encrypt a consumer's personal identification number (PIN) or other data for use in financial and retail transactions, as well as other transactions where secure data transfer is desired. In particular, the invention relates to advantageous methods of implementing low cost, portable encryption apparatus allowing flexibility in changing the encryption algorithm, the encryption keys, and the like.

BACKGROUND OF THE INVENTION

Financial and retail transaction systems have traditionally employed custom built encryption devices for use in the entry, storage and encryption of customer PINs. PIN devices are utilized in automated teller machines (ATMs), point-of-sale (POS) systems, consumer transaction terminals (CTT), and the like. Such PIN devices are used to allow consumers and other users to enter PINs for identification and authorization purposes. In the prior art, the design of such PIN devices generally incorporate custom circuitry to perform the encryption of the entered PIN. The most common means for PIN encryption is to utilize custom application specific integrated circuits (ASICs) or dedicated microprocessors to perform the encryption function. Although the use of ASICs or microprocessors allow great flexibility in the design of such devices, the unit cost of these devices can be substantial. Also, the ASIC designs themselves are often poorly maintained because the original ASIC designer may not be responsible for future updates, or because the ASIC design itself may be poorly documented. As a result, a given ASIC may need to be redesigned each time a change in the cryptography methodology is desired.

Consumers are advised to protect the integrity of their PINs by choosing non obvious numbers, and by committing the numbers to memory. However, the consumer cannot maintain absolute security of their PINs once the numbers are utilized in the completion of a transaction such as those described above. It is possible for a third party to electronically eavesdrop on a consumer by physically tapping the data lines leading from a PIN device, or by monitoring the electromagnetic radiation emitted by the PIN device. This problem is compounded as the systems that utilize PIN entry devices become physically smaller. For instance, a large ATM may be mounted behind a secure exterior wall or partition. In contrast, a CTT comprising a PIN entry device, or a PIN entry device connected to a POS terminal, may be quite small, and the device may be located in a public location which is not secure.

SUMMARY OF THE INVENTION

The present invention recognizes that there exists a need in a variety of contexts for methods and apparatus for storing and encrypting PIN data, or other data, in a non custom, programmable device such as a smart card, or the like, for use in a wide range of applications including financial or retail transaction systems. Such a device may advantageously be used to store a PIN encryption algorithm, encryption keys and other related algorithms. Such an apparatus also allows the encryption algorithm and encryption keys to be readily changed by authorized users. In another aspect, the methods described also advantageously allow the encryption device to authenticate the identity of other devices, such as a key initialization device and a key loading device, as well as to identify itself to other devices.

As described in greater detail below, the present invention may be much more readily implemented than typical existing methods, while providing more flexibility to make changes to the encryption algorithm than typical existing methods. A more complete understanding of the present invention, as well as further features and advantages of the invention, will be apparent from the following Detailed Description and the accompanying drawings.

DETAILED DESCRIPTION

The present invention will now be described more fully with reference to the accompanying drawings, in which currently preferred embodiments of the invention are shown. However, this invention may be embodied in various forms and should not be construed as limited to the exemplary embodiments set forth herein. Rather, the representative embodiments are described in detail so that this disclosure will be thorough and complete, and fully convey the scope, operation, functionality, structure and potential of applicability of the invention to those skilled in the art.

Figure 1A:
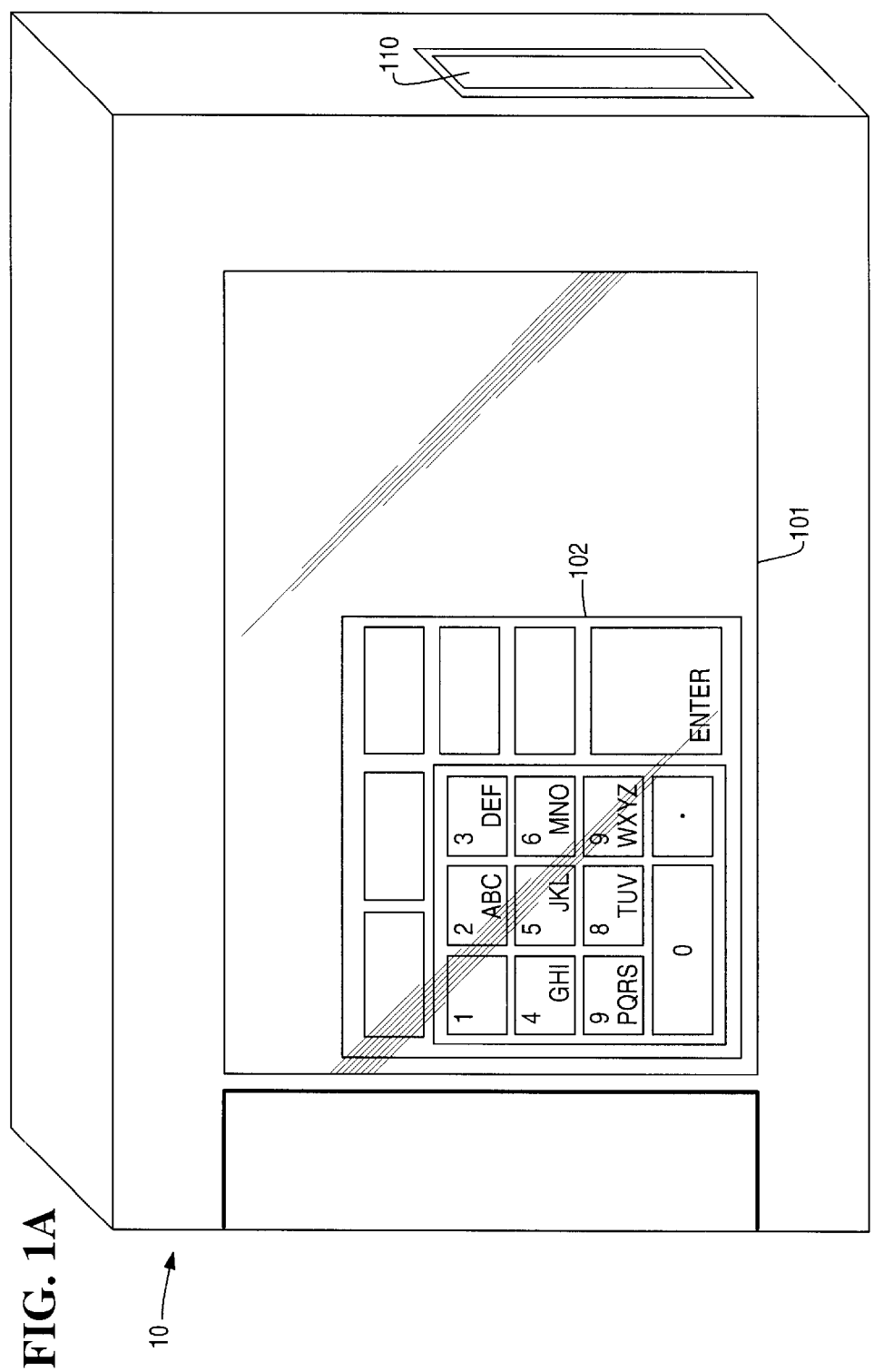
FIG. 1A illustrates a front perspective view of a consumer transaction terminal suitable for use in conjunction with the present invention.

FIG. 1A illustrates a front view of a consumer transaction terminal (CTT) 10 suitable for use in conjunction with the present invention. The CTT 10 includes a flat panel touch screen 101 that is utilized by a consumer to enter a personal identification number (PIN) in the course of a transaction. The flat panel touch screen 101 may consist of a flat panel LCD, or the like, as well as a touch screen overlay device. The flat panel LCD is utilized to display various screens of consumer transaction information, and the touch overlay device is utilized to detect touch input signals. A protected PIN entry area 102 may display icons representing numbers and letters, as well as command icons such as an "enter" key, and the like. A consumer may enter the PIN by touching the appropriate icons displayed in the protected PIN entry area 102. The touch input signals entered in the protected PIN entry area 102 are available for further processing by a limited number of other components contained within the CTT 10. These touch inputs are not made available to any external ports or connections, thereby protecting the consumer's PIN from electronic eavesdropping. Further details describing the separation of touch input signals are provided below. The CTT 10 may also contain a card slot 110, allowing a consumer to enter payment information from a credit card, debit card, or the like.

Figure 1B:
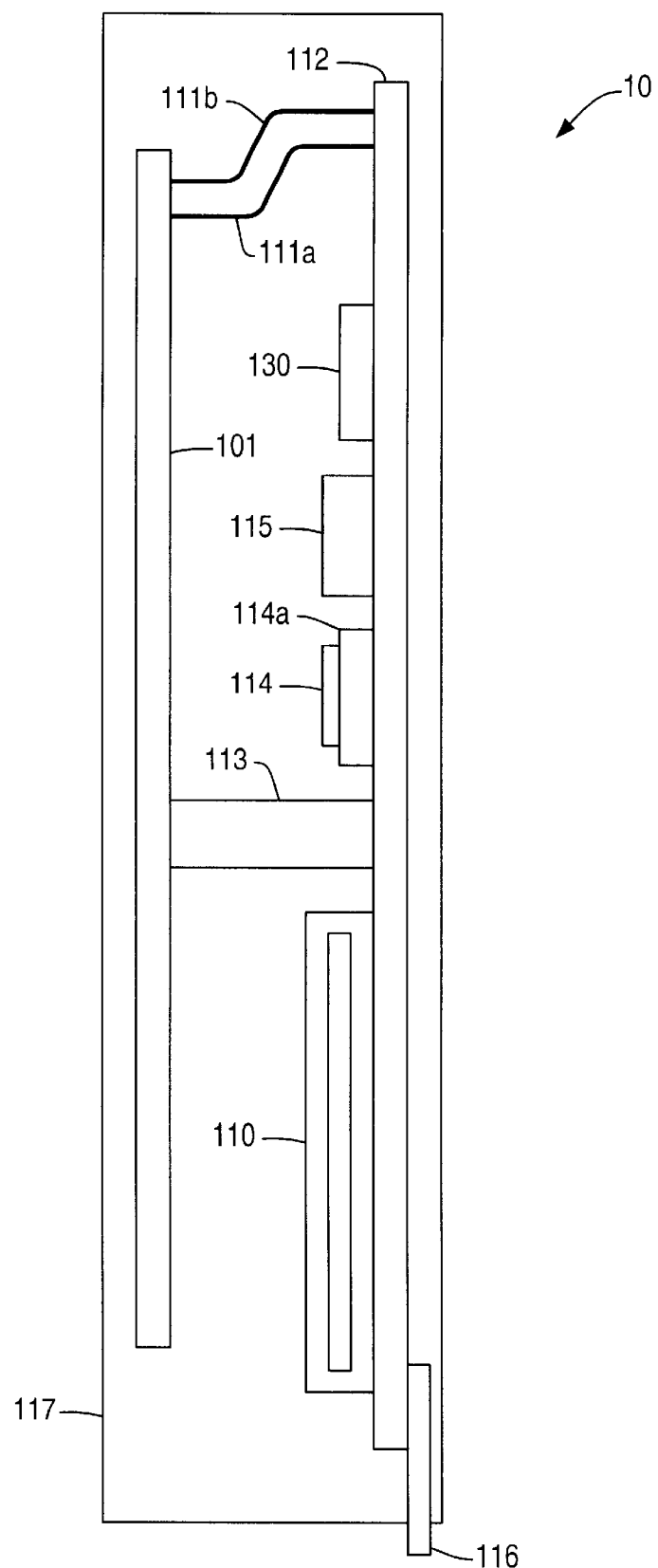
FIG. 1B illustrates an internal cross section of the consumer transaction terminal shown in FIG. 1A.

FIG. 1B illustrates an internal cross section of the CTT 10 shown in FIG. 1. The CTT 10 includes a flat panel touch screen 101 that is utilized by a consumer to enter the PIN. The flat panel touch screen 101 is electrically connected to a circuit board 112 by a connector 111a and a connector 111b, each of which may be a ribbon cable, or the like. Circuit board 112 may contain other components such as the internal extension of a card slot 110, a tamper detection device 113, a cryptographic punch-out smart card 114, a punch-out smart card socket 114a, a microcontroller 115, a microprocessor 130, a memory 131 and an external port 116. The cryptographic punch-out smart card 114 may contain encryption algorithms and encryption keys for processing a consumer's PIN, as well as other encryption functions. The tamper detection device 113 may be utilized to detect any unauthorized attempt to access the cryptographic punch-out smart card 114 or any other components within CTT 10 that share PIN data. For example, the tamper detection device 113 may be a plunger switch that will activate upon opening housing 117 and thus can be utilized to detect an unauthorized attempt to open housing 117. As illustrated in FIG. 1B, the flat panel touch screen 101 is electrically and mechanically attached to the circuit board 112 in such a manner that the flat panel touch screen 101 blocks access to the cryptographic punch-out smart card 114. Therefore, the tamper detection device 113 may also detect any unauthorized attempt to disassemble the flat panel touch screen 101 from the circuit board 112. It will be recognized that other types of switches, switch arrangements, or a combination of other tamper detection devices may be utilized, and that the plunger switch is recited herein as exemplary of such a device.

The microcontroller 115 is utilized to route touch input signals from flat panel touch screen 101 to cryptographic punch-out smart card 114 as well as other functions related to the processing of PIN data and encryption. In the exemplary CTT 10 illustrated in FIG. 1B, the microcontroller 115 utilizes the connector 111a, which comprises a 4-wire touch screen interface, to communicate with the flat panel touch screen 101. The external port 116 may be utilized by authorized personnel to update or change information stored in cryptographic punch-out smart card 114. The components of the CTT 10 described above are contained within a housing 117. The operation of the above components is described below in further detail.

Figure 1C:
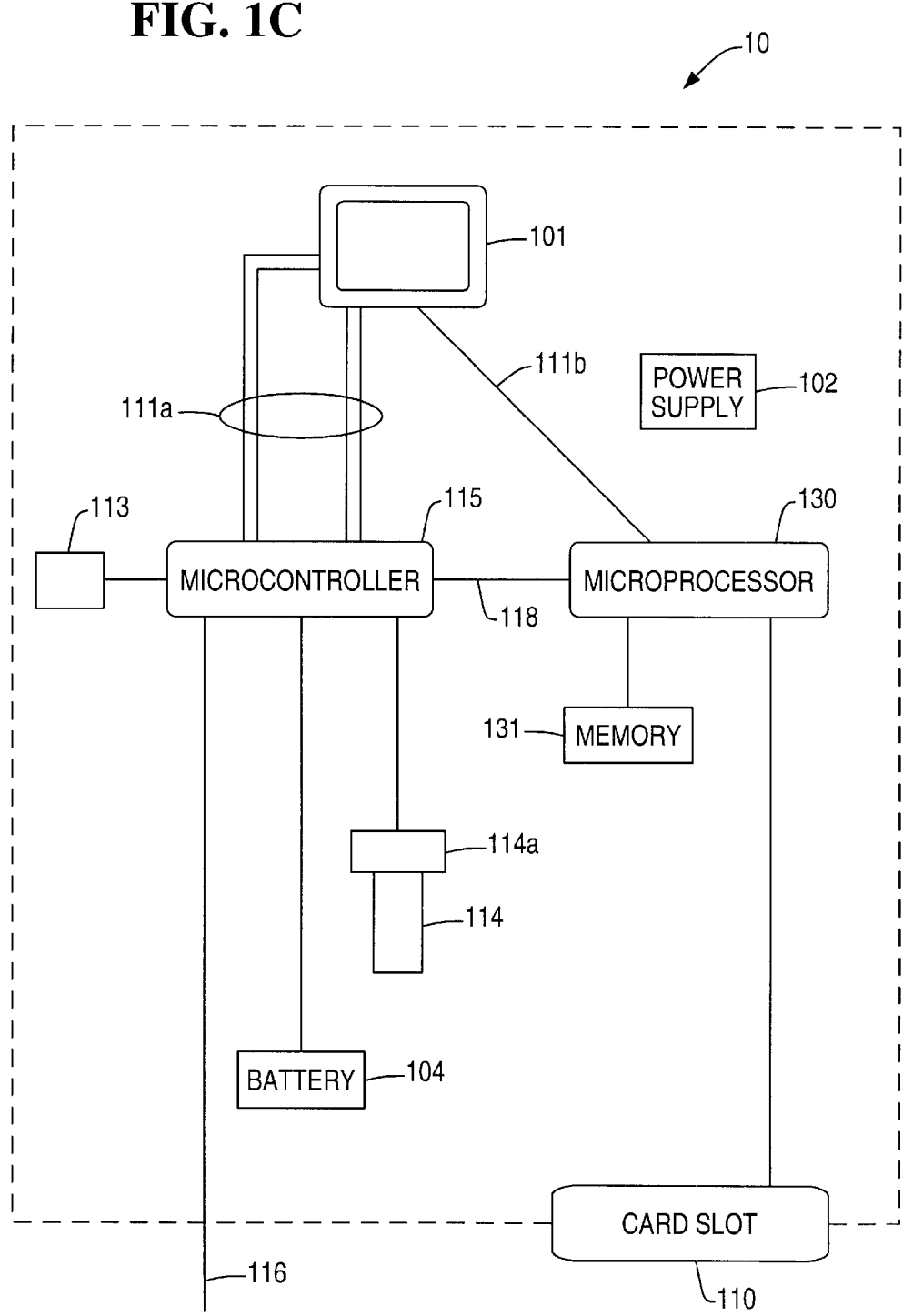
FIG. 1C illustrates a block diagram of the consumer transaction terminal shown in FIG. 1A for use in accordance with the present invention.

FIG. 1C illustrates a block diagram of the CTT 10 for use in accordance with the present invention. The CTT 10 primarily includes the previously mentioned flat panel touch screen 101, the power supply 102, the cryptographic punch-out smart card 114, the punch-out smart card socket 114a, the microcontroller 115, the microprocessor 130, the battery 104, the tamper detection device 113 and the external port 116. It is noted that a smart card designed with the punch-out form factor is one in which the microelectronics of the smart card have been 'punched-out' from the typical credit card form factor. The flat panel touch screen 101 is electrically connected to the microcontroller 115 by the 4-wire interface 111a, as well as to the microprocessor 130 by the standard display interface 111b. Microcontroller 115 is electrically connected to microprocessor 130 by a data bus 118. Data bus 118 is utilized by microcontroller 115 to send encrypted PIN data to microprocessor 130. Battery 104 provides backup power to the microcontroller 115 and the cryptographic punch-out smart card 114. The cryptographic punch-out smart card 114 is plugged into the punch-out smart card socket 114a that is electrically connected to the microcontroller 115. The CTT 10 also includes a card slot 110 that is utilized to accept consumer credit cards, debit cards, and the like.

Referring again to FIGS. 1A and 1C, the internal microcontroller 115, which is isolated from external access, is the only device that receives the touch input signals from the flat panel touch screen 101 since the flat panel touch screen is electrically connected to the microcontroller 115 by the 4-wire interface 111a. Touch input signals that do not originate within the protected PIN entry area are passed directly to the microprocessor 130 via the data bus 118.

Two of the wires of the 4-wire interface 111a are utilized to send reference voltage signals to the x and y axes of the flat panel touch screen 101. The other two wires of the 4-wire interface 111a are utilized to send detected touch input signals from the flat panel touch screen 101 to the microcontroller 115. The two touch input signals are a fraction of the input reference signals, and are utilized by microcontroller 115 to determine an x-y coordinate that corresponds to the point on the surface of the flat panel touch screen 101 that is being touched by a consumer. The microcontroller 115 is preferably enabled to encrypt these signals to prevent a third party from easily tapping the 4-wire interface 111a signal lines. One presently preferred approach is described in U.S. patent application Ser. No. 09/391,767 "Methods and Apparatus Providing Secure Signals From a Touch Panel Display", filed Sep. 8, 1999, which is incorporated by reference herein in its entirety.

Figure 2:
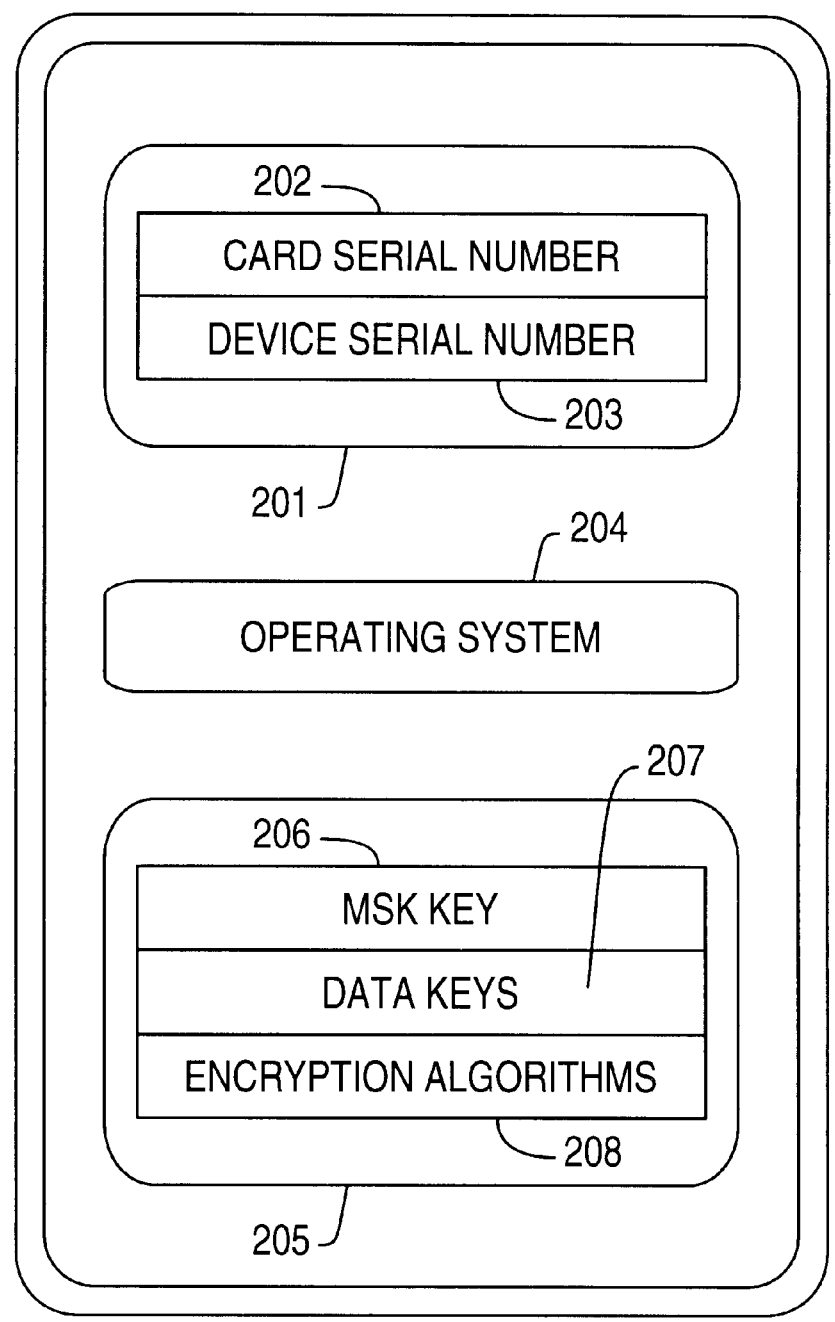
FIG. 2 illustrates a block diagram of the stored contents of a cryptographic punch-out smart card.

FIG. 2 illustrates a block diagram of the stored contents of a cryptographic smart card 114 for use in conjunction with the present invention. The cryptographic smart card 114 contains a unique device identifier 201, an operating system 204 and a file system 205. The device identifier 201 is comprised of a cryptographic smart card serial number 202 and a device serial number 203. The cryptographic smart card serial number 202 is assigned by the manufacturer of the cryptographic smart card. The device serial number 203 is assigned by the manufacturer of the device into which the cryptographic smart card is to be installed, such as the CTT 10 illustrated in FIGS. 1A, 1B and 1C above. The operating system 204 enables the cryptographic smart card 114 to execute application programs stored in the file system 205. The file system 205 may contain application programs including encryption algorithms 208 that are utilized to perform the encryption of PIN data. The file system 205 may also contain a master key storage (MSK) key 206 and one or more data keys 207 that are utilized by the encryption algorithms 208. In one embodiment of the present invention, the MKS key is a derived key that is created by encrypting the card serial number 202, the device serial number 203, a first random seed provided by the CTT manufacturer and a second random seed generated by the encryption algorithm 208. One example of such a procedure for deriving the MSK key is described in further detail below in the description of FIG. 3.

In one embodiment of the present invention, the CTT 10 is a physically secure, sealed apparatus. By incorporating a tamper detection mechanism into the housing of CTT 10, such as tamper detection mechanism 113 as shown in FIGS. 1B and 1C, the touch input signals cannot be tapped without triggering the tamper detection mechanism. This tamper detection mechanism prevents unauthorized access to the touch input signals as well as to the encryption algorithms and encryption keys stored on the cryptographic smart card 114. Microcontroller 115 is enabled to separate the touch input signals that originate from one portion of the flat panel touch screen 101 from other touch input signals. In one embodiment of the present invention, the microprocessor of a CTT, such as microprocessor 115 and CTT 10 as shown in FIGS. 1A, 1B and 1C, is programmed such that the display screen layout incorporates a protected PIN entry area 102. This protected PIN entry area 102 is predetermined during the programming design of the screen layout. The programming of microcontroller 115 enables the microcontroller 115 to route and control the touch input signals that originate from protected PIN entry area 102 to the cryptographic smart card 114 for encryption of the entered PIN data. Microcontroller 115 is connected to tamper detection mechanism 113, and is further enabled to subsequently route the encrypted PIN data to microprocessor 130. Microcontroller 115 is further enabled to monitor a signal from tamper detection mechanism 113. This signal would indicate that an attempt is being made to tamper with CTT 10. If such a signal from tamper detection mechanism 113 is received by microcontroller 115, the microcontroller sends a signal to the cryptographic smart card 114 instructing it to permanently erase the encryption algorithms and encryption keys stored within the cryptographic smart card.

Microcontroller 115 is further enabled to route the touch input signals that originate from outside of the protected PIN entry area 102 directly to microprocessor 130. Microprocessor 130 is enabled, by utilizing a standard operating system and application program, to further process the encrypted PIN data, and to control the content of the information displayed on the flat panel touch screen 101. Such operating systems and application programs are well known in the art of personal computers, automated teller machines (ATM), and the like, and will not be discussed further. Unlike microcontroller 115, microprocessor 130 does communicate with the outside world utilizing standard, well understood physical and programming interfaces. It should be noted that a person attempting to monitor the entered PIN, or other data, through an attack on these interfaces will be unable to gain access to the PIN, or other data. This is due to the fact that the entered PIN, or other data, is never provided to the microprocessor 130 in its unencrypted state, and is therefore not externally accessible.

A smart card, such as cryptographic smart card 114 shown in FIG. 2, may be a smart card that contains encryption algorithms, encryption keys, and the like. In the presently preferred embodiment of the present invention, the smart card 114 may be a smart card that is specially designed for cryptography and other encryption techniques. Such specially designed smart cards preferably contain industry standard operating system software, file system software and cryptographic algorithms such as DES, RSA, and the like. Smart cards of this type are known as cryptographic smart cards. Cryptographic smart cards are available in many form factors including a single inline module (SIM), also known as a "punch-out" smart card.

Figure 3:
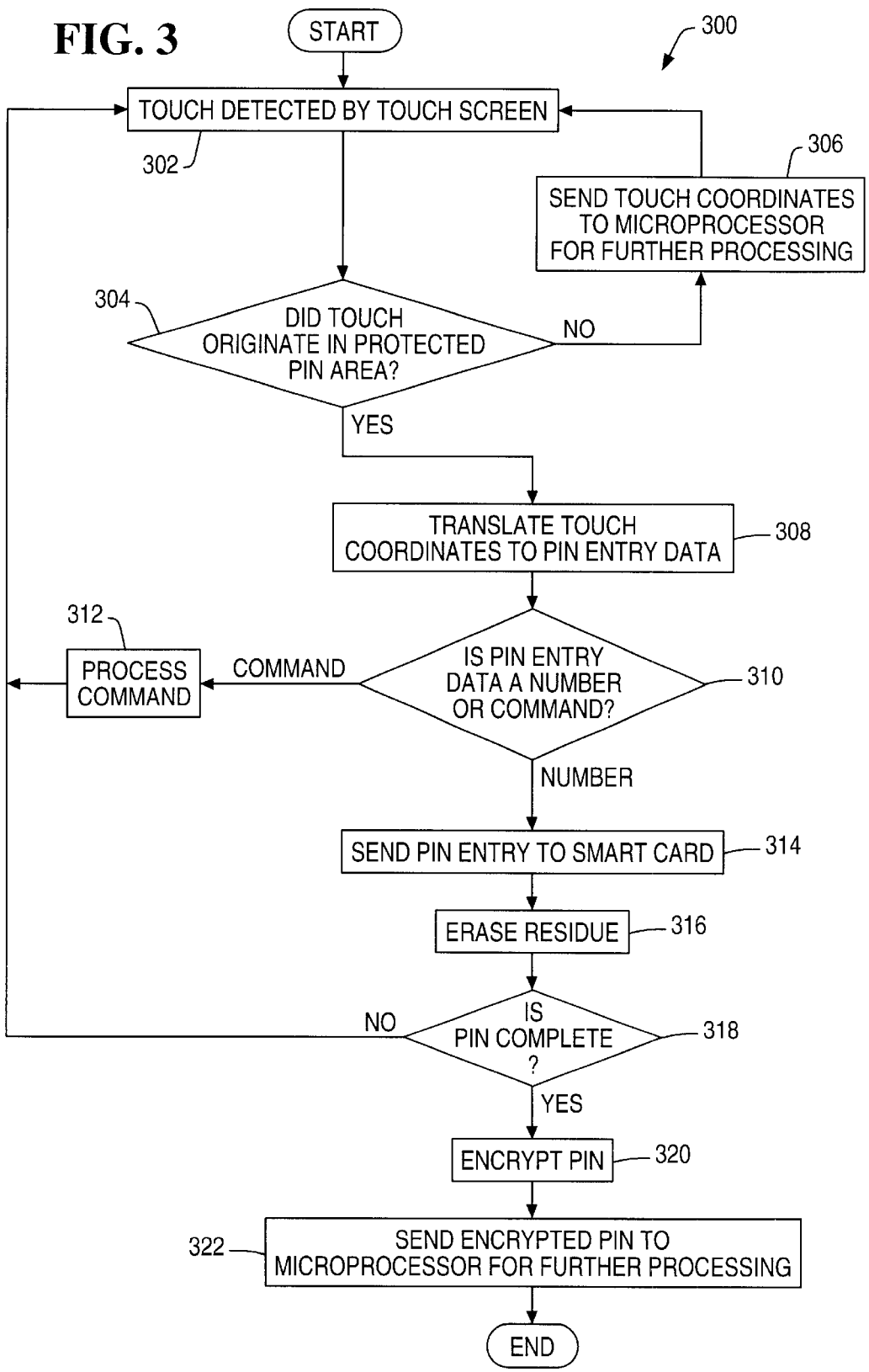
FIG. 3 illustrates a method for separating PIN entry data from other touch input signals in accordance with the present invention.

FIG. 3 illustrates a method 300 for separating PIN entry data from other touch input signals. The process begins at step 302 where a touch input is detected by a flat panel touch screen, such as the flat panel touch screen 101 shown in FIG. 1A. At step 304, it is determined by a microcontroller, such as the microcontroller 115 shown in FIG. 1C, if the touch input signal originated in a protected PIN entry area, such as the protected PIN area 102 shown in FIG. 1A. If not, the process proceeds to step 306 where the touch input signal coordinates are sent to a microprocessor, such as microprocessor 130 shown in FIG. 1C, for further processing. Such further processing includes functions such as updating the information displayed on a flat panel touch screen, or the like. The process then proceeds back to step 302, and waits for another touch input signal to be detected.

Referring back to step 304, if it is determined that the touch input signal originated in the protected PIN entry area, the process proceeds to step 308. At step 308, the touch input signal coordinates are translated into a number or a command representing an element of PIN entry data. It is noted that a number, in the context of this discussion, may be either a numeral or a letter, based upon the expected allowable components of the PIN. Proceeding to step 310, it is then determined if the element of PIN entry data represents a number or a command. Such commands may include an "enter" command, a "restart" command, a "cancel" command, or the like. If the element of PIN entry data represents a command, the process proceeds to step 312, and the command indicated is processed. The process then proceeds back to step 302, and waits for another touch input signal to be detected.

Referring back to step 310, if it is determined that the PIN entry data represents a number, the process proceeds to step 314. At step 314, the number is sent to a cryptographic smart card, such as the cryptographic smart card 114 shown in FIGS. 1B and 1C, and the process proceeds to step 316. At step 316, any residue remaining from step 314 is permanently erased. Such residue may include, but is not limited to, the x-y coordinates of the touch input detected at step 302, and the like. At step 318, it is determined if the entered PIN data is complete. A completed PIN may be indicated upon the detection of a predetermined number of numerals and letters, or upon receipt of an appropriate command such as "enter", or the like. If the PIN is not complete, the process then proceeds back to step 302, and waits for another touch input signal to be detected. If the PIN is complete, the process proceeds to step 320. At step 320, the completed PIN is encrypted by a cryptographic smart card, such as the cryptographic smart card 114 shown in FIGS. 1B and 1C, and the process proceeds to step 322. At step 322, the encrypted PIN is sent to a microprocessor, such as the microprocessor 130, for further processing and the process ends.

Figure 4:
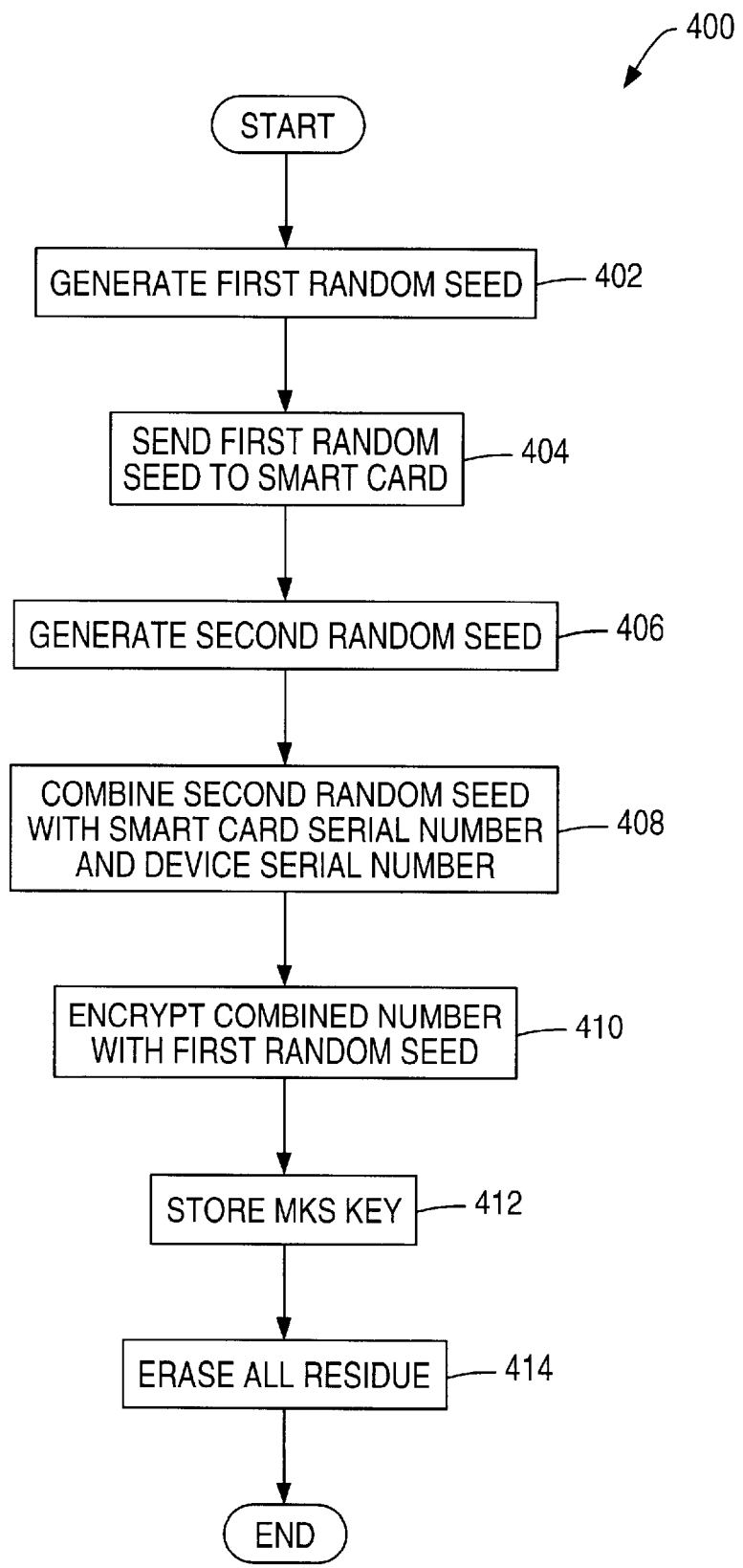
FIG. 4 illustrates a method for creating a master key storage (MSK) key suitable for use with the present invention.

FIG. 4 illustrates a method 400 for creating a master key storage (MSK) key suitable for use with the present invention. The process begins at step 402 where a first random seed is generated by the manufacturer of a CTT, such as the CTT 10 illustrated in FIG. 1A. At step 404, the first random seed is sent to a cryptographic smart card, such as the cryptographic smart card 114 of FIG. 2. Proceeding to step 406, the cryptographic smart card 114 generates a second random seed in response to receiving the first random seed. At step 408, the cryptographic smart card 114 combines the second random seed, a cryptographic smart card serial number and a device serial number, such as the cryptographic smart card serial number 202 and the device serial number 203 shown in FIG. 2. Proceeding to step 410, the cryptographic smart card 114 generates the MSK key 206 by encrypting the first random seed with the combined second random seed, the cryptographic smart card serial number and the device serial number. At step 412, the MKS key is stored in the cryptographic smart card. At step 414, the cryptographic smart card permanently erases all of the residues associated with the generation of the MSK key, and the process ends.

Permanently erasing the residue of the MSK key creation process ensures that the key remains secure in that it can not be recreated from the residue. Since the MSK key is generated within the cryptographic smart card, and the MSK key is never seen as plaintext outside of the cryptographic smart card, all other data keys 307 generated with the MSK key are secure and unique to the cryptographic smart card.

Figure 5:
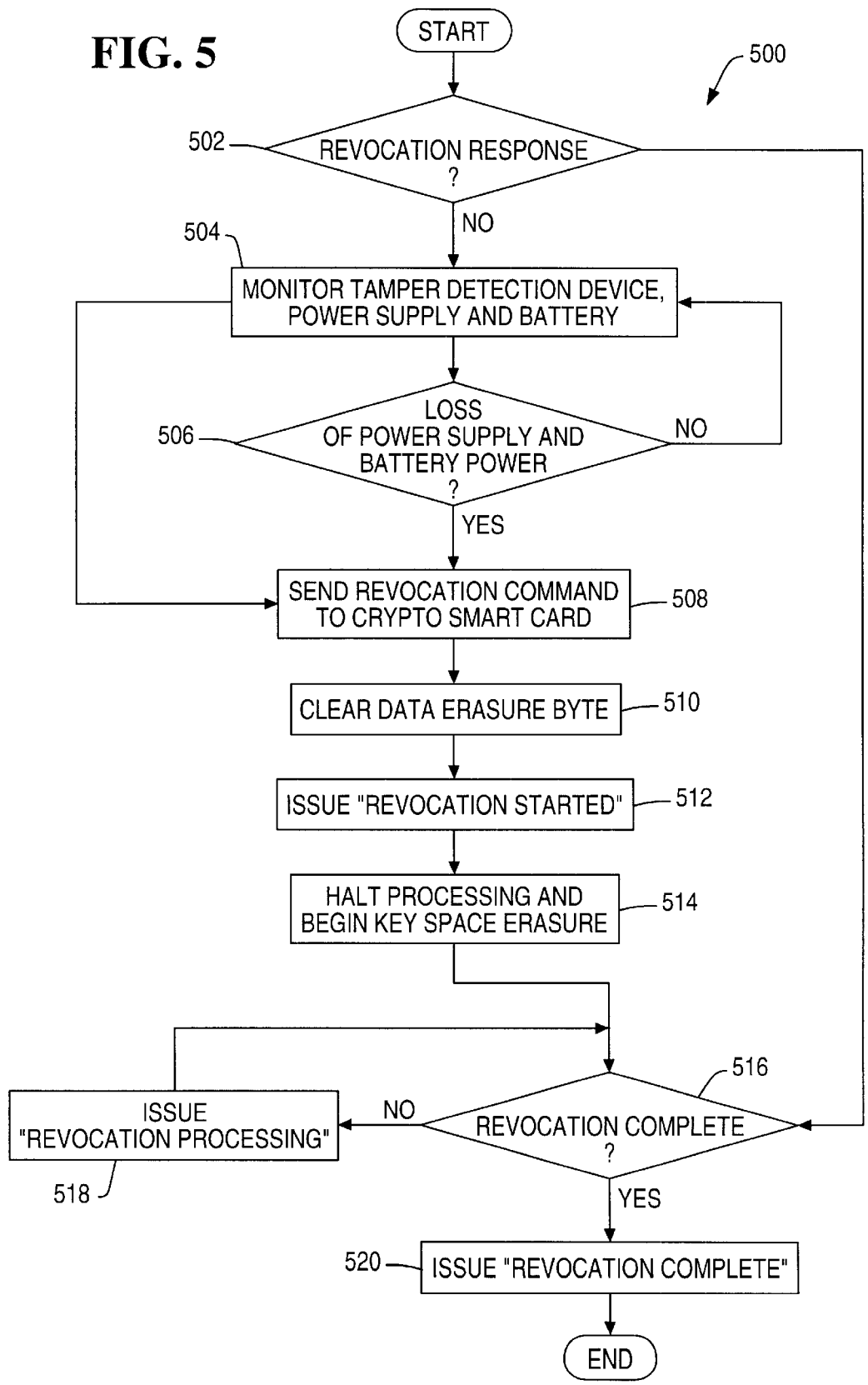
FIG. 5 illustrates a method for erasing an MSK key and all data keys from a cryptographic smart card upon detection of tampering in accordance with the present invention.

FIG. 5 illustrates a method 500 for erasing an MSK key and all data keys from a cryptographic smart card. In a presently preferred embodiment, method 500 is invoked upon detection of tampering. Such tampering may be detected when the housing of a CTT is opened, or when access to a cryptographic smart card is detected. Detection of such tampering may be provided by a tamper detection device, such as the tamper detection device 113 shown in FIGS. 1B and 1C, or some other tamper detection device or a combination of multiple such devices. In another embodiment, method 500 will be invoked when the cryptographic smart card detects the loss of both external power and internal battery power.

Process 500 begins at step 502, where a query is sent to a cryptographic smart card such as the cryptographic smart card 114 illustrated in FIG. 2. In a typical application, when a CTT such as the CTT 10 is powered on, the CTT microprocessor 130 sends a query to the cryptographic smart card 114 to determine if the security functions of the cryptographic smart card are active. This query is sent automatically as part of the CTT 10 power on initialization sequence. If the cryptographic smart card replies to the query with a "revocation started", "revocation processing" or "revocation completed" response, the security functions of the cryptographic smart card have been compromised, and the process proceeds to step 516. If none of the "revocation" messages are received, the security functions of the cryptographic smart card are active, and the CTT is ready for secure operation. At step 504, a microcontroller monitors the state of a tamper detection device, as well as the state of a power supply and a battery, such as microcontroller 115, tamper detection device 113, power supply 102 and battery 10, respectively. If the microcontroller 115 detects that the power supplied by either the power supply 102 or the battery 104 has been interrupted, the process proceeds to step 506. At step 506, the cryptographic smart card 114 determines if power has been lost from both the power supply 102 and the battery 104. A momentary interruption in the supply of power from both the power supply 102 and the battery 104 may be indicative of tampering. If the supply of power from both the power supply 102 and the battery 104 is momentarily interrupted, the process proceeds to step 508 upon the resumption of power supplied from either the power supply 102 or the battery 104. If the supply of power is intact from one of the supply sources, the process loops back to step 504. Alternatively, referring back to step 504, if the microcontroller 115 determines that the tamper detection device 113 has been activated, the process also proceeds to step 508.

At step 508, the microcontroller 115 sends a "revocation" command to the cryptographic smart card 114, and the process proceeds to step 510. At step 510, the cryptographic smart card clears a data erasure byte, thereby putting the cryptographic smart card 114 into a data erasure state. At step 512, the microcontroller 115 sends a "revocation started" command back to the microcontroller 115 indicating that the data erasure byte has been cleared, and that the key erasure procedure has begun. At step 514, the cryptographic smart card 114 halts any other processing that may have been in progress, and proceeds to begin erasing the MKS key and other data keys stored in the key space of the cryptographic smart card. At step 516, the cryptographic smart card is enabled to respond to any new queries while the erasure process proceeds. If such a query is received, the process proceeds to step 518 where the cryptographic smart card issues a "revocation processing" message to the querying device, and the process proceeds back to step 516. The "revocation processing" message is sent to the querying device to indicate that the key erasure procedure is in process. When the erasure process is completed, the process proceeds to step 520, and the cryptographic smart card 114 issues a "revocation complete" message. The "revocation processing" message is sent to all querying devices to indicate that the key erasure procedure has been completed, and that the security functions of the cryptographic smart card are no longer viable. After the "revocation processing" message is sent, the process ends.

Referring back to step 510, once the data erasure byte is cleared, the data erasure process will be completed regardless of any intervening events that may occur. For instance, if the battery 104 is removed and the power supply 102 is switched off after the tamper detection device 113 has been activated, the erasure process will continue once the supply of power is restored. In the instance where power has been switched off, the process 500 will begin again at step 502. When the cryptographic smart card 114 is queried in this instance, the cryptographic smart card responds with a "revocation started", "revocation processing" or "revocation completed" message, depending upon what point in the erasure process the power was switched off. The process then proceeds to step 516, and continues as described above.

While the present invention is disclosed in the context of various aspects of presently preferred embodiments, it will be recognized that a wide variety of implementations may be employed by persons or ordinary skill in the art consistent with the above discussion and the claims that follow below. Such implementations of the present invention may include the encryption of data for a wide variety of applications where the secure transfer of data is desired.

We claim:

1. A secure apparatus for encrypting data comprising:
   a touch screen device, the screen layout of said touch screen comprising a protected data entry screen area and an unprotected data entry screen area;
   a first processor, said first processor being affixed to a circuit board, said first processor being further operative to communicate with an encryption device and a touch screen device, and the first processor being further operative to determine whether a touch input detected by the touch screen device originated in the protected data entry screen area or the unprotected data entry screen area;
   an encryption device operative to encrypt touch inputs that originated in the protected data entry screen area; and
   a tamper detection mechanism.

2. The apparatus of claim 1 wherein the protected data entry screen area of the touch screen device is enabled to receive a plurality of touch inputs, the plurality of said touch inputs comprising personal identification number (PIN) data, commands or both.

3. The apparatus of claim 2 wherein the touch screen is comprised of an LCD flat panel display and a touch screen overlay device, the touch screen overlay device being operative to communicate with the first processor utilizing a four wire interface.

4. The apparatus of claim 3 wherein the tamper detection mechanism is a plunger switch, said switch affixed to the circuit board in a manner such that an attempt to gain access to the first processor, the four wire interface or the encryption device results in the detection of tampering.

5. The apparatus of claim 4 wherein the encryption device is a cryptographic smart card, said cryptographic smart card being affixed to the circuit board in such a manner that an attempt to access the cryptographic smart card results in the detection of tampering.

6. The apparatus of claim 5 wherein the cryptographic smart card is a punch-out cryptographic smart card.

7. The apparatus of claim 6 wherein the first processor is a microcontroller enabled to communicate with the touch screen device utilizing the four wire interface, the tamper detection mechanism, the cryptographic smart card and a second processor, and is not operative to communicate with any devices external to the secure apparatus.

8. A secure apparatus for encrypting data comprising:
   a touch screen device, the screen layout of said touch screen comprising a protected data entry screen area and an unprotected data entry screen area;
   a first processor, said first processor being affixed to a circuit board, said first processor being further operative to communicate with an encryption device and a touch screen device, and the first processor being further operative to determine whether a touch input detected by the touch screen device originated in the protected data entry screen area or the unprotected data entry screen area;
   a second processor, said second processor being affixed to the circuit board, said second processor being further operative to communicate with the first processor and the touch screen device;
   an encryption device operative to encrypt touch inputs that originated in the protected data entry screen area; and
   a tamper detection mechanism.

9. The apparatus of claim 8 wherein the first processor is a microcontroller enabled to communicate with the touch screen device, the tamper detection mechanism, the cryptographic smart card and a second processor, and is not operative to communicate with any devices external to the secure apparatus; and
   wherein the second processor is a microprocessor enabled to communicate with the first processor, the touch screen device, and is operative to communicate with any devices external to the secure apparatus.

10. A system for encrypting data comprising:
    a display device comprising an LCD flat panel display and a touch panel device;
    a first processor connected to said touch panel overlay device, said first processor being operative to decode touch input signals from said touch panel overlay device;
    a second processor, said second processor being operative to execute application software for controlling the images displayed on the LCD flat panel display;
    a cryptographic smart card operable to encrypt data; and
    a tamper detection device, said tamper detection device being operative to signal said cryptographic smart card if the tamper detection device detects tampering.

11. The system of claim 10 wherein the data is PIN data.

12. The system of claim 11 wherein the cryptographic smart card is operative to permanently erase one or more encryption algorithms stored within a memory of said cryptographic smart card upon said cryptographic smart card receiving a signal from the first processor indicating that the tamper detection device has detected tampering.

13. The system of claim 12 wherein the first processor is further operable to separate touch input signals detected in a protected data entry portion of said touch panel device from touch input signals detected in the nonprotected data entry portion of said touch panel device.

14. The system of claim 13 wherein the first processor is further operable to send the touch signals detected in the protected data entry portion of said touch panel device to the cryptographic smart card only, and to send the touch signals detected in the nonprotected data entry portion of said touch panel device to the second processor only.

15. The system of claim 14 wherein the first processor is further enabled to receive encrypted data from the cryptographic smart card and to send the encrypted data to the second processor.

16. A method of encrypting data, the method comprising the steps of:
    detecting touch input signals from a touch screen;
    determining whether said touch input signals originated in a protected data entry portion of said touch screen or in a non protected data entry portion of said touch screen;
    translating only the touch input signals that originated in the protected data entry portion of the touch screen into data;
    sending the data to a cryptographic smart card; and
    encrypting the data.

17. The method of claim 16 wherein the data originating in the protected data entry area is PIN data.

18. A method of encrypting PIN data, the PIN data comprising one or more data elements, the method comprising the steps of:
    detecting a first touch input signal from a touch screen;
    determining whether said first touch input signal originated in a protected PIN data entry portion of said touch screen;
    translating the first touch input signal into a first data element if the first detected touch input signal originated in the protected PIN data entry portion of the touch screen;
    determining if the first data element is an alphanumeric character or a command; and
    storing said first data element that is an alphanumeric character as a first PIN data element or executing said first data element that is a command.

19. The method of claim 18 further comprising the steps of:
    determining if a predetermined number of data elements have been stored, the predetermined number of data elements comprising a PIN;
    detecting subsequent data elements if said predetermined number of data elements have not been stored; and
    sending said predetermined number of data elements comprising the PIN to a cryptographic smart card and encrypting the PIN.

20. A method of generating a master key storage (MSK) key for a device, the method comprising the steps of:
    generating a first random seed;
    sending the first random seed to a cryptographic smart card;
    generating a second random seed;
    combining said second random seed with a cryptographic smart card serial number and a device serial number thereby generating an intermediate data key;

encrypting said data key with the first random seed, thereby generating the MSK key; and storing the MSK key within the cryptographic smart card.

21. The method claim 20 further comprising the step of permanently erasing the residue of the MSK key generation process, the residue comprising the first random seed, the second random seed and the intermediate data key.

22. A method for maintaining the integrity of data keys stored within a cryptographic smart card, the method comprising the steps of:

monitoring a tamper detection signal, the absence of the tamper detection signal indicating that the cryptographic smart card has not been tampered with;

monitoring a power supply input and a battery input, the presence of the power supply input and the battery input indicating that the supply of electrical power to the cryptographic smart card is uninterrupted; and clearing a data erasure byte upon the detection of the presence of the tamper detection signal, or upon the absence of both the power supply input and the battery input, thereby putting the cryptographic smart card into a data erasure state.

23. The method of claim 22, further comprising the steps of:

issuing a message to any devices communicating with the cryptographic smart card, the message indicating that the cryptographic smart card is entering a data erasure state;

halting the execution of any other processing within the cryptographic smart card; and executing a process to erase one or more data keys stored within the cryptographic smart card.

24. The method of claim 23, further comprising the step of issuing a message to any devices communicating with the cryptographic smart card, the message indicating that the cryptographic smart card has erased all of the one or more data keys stored within the cryptographic smart card.

25. The method of claim 24, further comprising the steps of:

detecting the interruption and resumption of the supply of electrical power to the cryptographic smart card;

issuing a message to any devices communicating with the cryptographic smart card, the message indicating that the process of erasing all of the one or more data keys stored within the cryptographic smart card; and completing the process of erasing all of the one or more data keys stored within the cryptographic smart card.

* * * * *